United States Patent [19]

Watanabe

[11] 3,883,694

[45] May 13, 1975

[54] LOUD SPEAKER FOR TELEPHONE

[76] Inventor: Kenichi Watanabe, 4-14-17, Naka-machi, Setagaya-ku, Tokyo, Japan

[22] Filed: Apr. 27, 1973

[21] Appl. No.: 354,999

[30] Foreign Application Priority Data

| | | |
|---|---|---|
| May 8, 1972 | Japan | 47-53466 |
| Dec. 23, 1972 | Japan | 48-618 |
| Dec. 30, 1972 | Japan | 48-1049 |

[52] U.S. Cl. .......... 179/1 HF; 179/1 C

[51] Int. Cl. .......... H04m 1/21

[58] Field of Search .......... 179/1 SW, 82, 167, 168, 179/100 L, 100 D, 100 C, 1 HF, 1 C, 81 B, 2 C, 6 R, 6 AC

[56] References Cited

UNITED STATES PATENTS

| | | | |
|---|---|---|---|
| 2,632,811 | 3/1953 | Fouget | 179/81 B |
| 2,657,265 | 10/1953 | Branson | 179/1 C |
| 2,831,923 | 4/1958 | Block | 179/1 C |
| 2,877,302 | 3/1959 | Radomski | 179/1 HF |
| 3,130,270 | 4/1964 | Sanders | 179/1 A |
| 3,301,955 | 1/1974 | Clements | 179/81 B |
| 3,396,245 | 8/1968 | Flygstad | 179/1 C |

FOREIGN PATENTS OR APPLICATIONS

| | | | |
|---|---|---|---|
| 718,772 | 3/1953 | United Kingdom | 179/168 |

OTHER PUBLICATIONS

IBM Technical Disclosure Bulletin, Dictating Control System, M. Emig, Nov. 1970, p. 1686.

*Primary Examiner*—David L. Stewart
*Attorney, Agent, or Firm*—Donald D. Mon; D. Gordon Angus

[57] ABSTRACT

A loud speaker device for use with a telephone comprises a pick-up coil, a loud speaker, an amplifier, a battery and a switch, which may be a gravity type switch, within a non-magnetic casing having covers at its ends, with an opening through the cover at one end for inserting the battery and releasing the sound. Projections on the last-mentioned end cover provide space for the sound release. Voice currents are induced in the coil by placing it near a telephone carrying the voice currents.

2 Claims, 5 Drawing Figures

LOUD SPEAKER FOR TELEPHONE

The present invention relates to a loud speaker device for a telephone, and more particularly to a small and compact loud speaker device , which it is possible to hear the voice received in the telephone as a louder amplified voide, by putting the device near the telephone and inverting it end for end.

Therefore, the first object of the present invention is to provide a loud speaker device to amplify the voice of the telephone by putting it near the telephone.

A second object of the present invention is to provide a loud speaker device which it is possible to operate by simply inverting the equipment or by a manual switch.

A third object of the present invention is to provide a small and compact loud speaker apparatus, such as cylindrical form.

A fourth object of the present invention is to indicate the position for approaching the telephone by a simple and attractive configuration of the end face of the apparatus which opens to the face of the speaker.

A fifth object of the present invention is to provide a projection at the cover of the apparatus and separate the bottom face from the ground to make the voice clear and articulate.

The construction of the invention and method of operation, however, together with additional objects and advantages, will be best be understood from the following description of specific embodiments and the accompanying drawings, of which;

FIGS. 3*a*, 3*b*, and 3*c* are front, plan and bottom views respectively of an another embodiment of the present invention.

Figure 1:
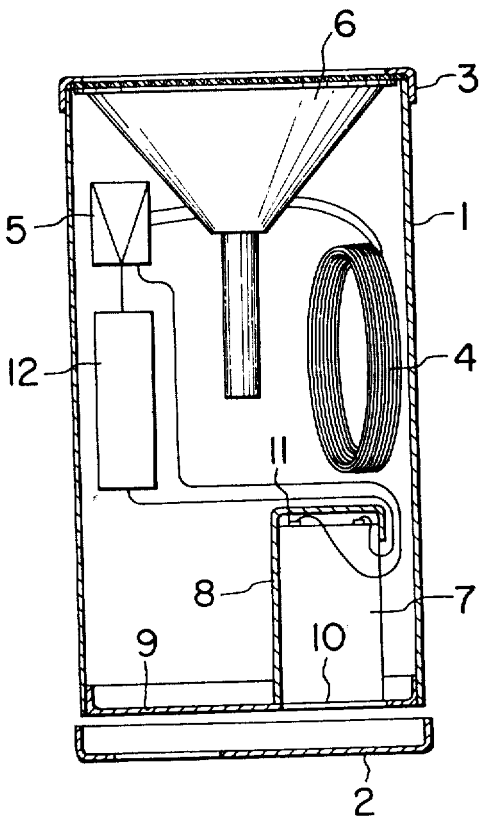
FIG. 1 is an elevation view in cross section of an embodiment of the present invention.

Referring now to the drawings, and first particularly to FIG. 1 thereof, 1 is a cylindrical case of non-magnetic material, 2 and 3 are upper and lower covers mounted on case 1 respectively. 4 is a pick-up coil fixed inside the cylindrical face of case 1 for picking up the voice signal of the telephone. 5 is a transistor amplifier for amplifying said voice signal generated in said coil 4 and fixed in said case 1. 6 is a speaker for transducing the output of said amplifier 5 into voice and fixed inside of said upper lid 3. 7 is battery fixed in said case 1 for providing electric power to said amplifier. This battery 7 is inserted through the opening 10 of inner wall 9 into box 8 and engages with socket 11. 12 is a gravity switch fixed in said case 1, and closes the circuit of the electric source when said apparatus is inverted as shown in FIG. 1.

Operation of the said apparatus is as follows:

In the rest state, the case is positioned so that the upper cover 2 of case 1 is the uppermost part of the apparatus and switch 12 is off. At using state, case 1 is put near the telephone and positioned so that cover 2 is lowermost, and lower cover 3 is uppermost as in FIGS.

1 and 2. The voice signal of the telephone is picked up by pick-up coil 4, amplified by amplifier 5 and transmitted to speaker 6 so that it is possible to listen to the voice of the telephone as a loud voice.

Figure 2:
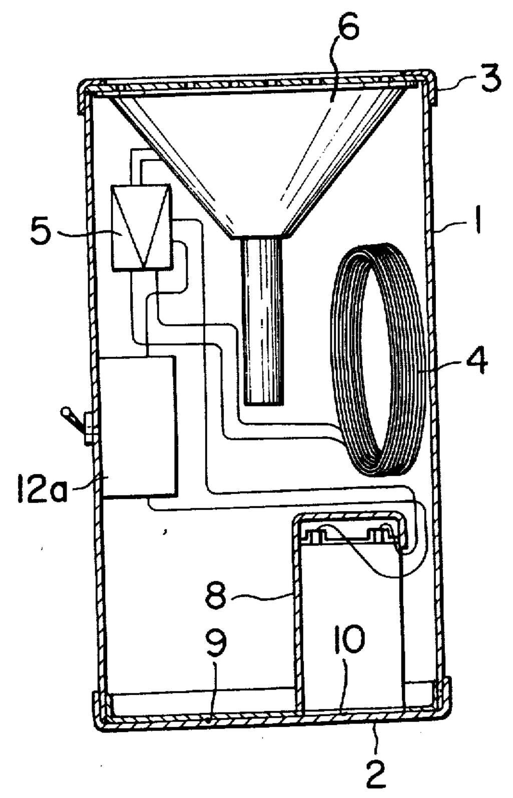
FIG. 2 is an elevation view in cross section of an another embodiment of the present invention.

FIG. 2 shows another embodiment of the present invention. In this embodiment, manual switch 12*a* is employed instead of the said gravity switch 12 in FIG. 1.

Figure 3:
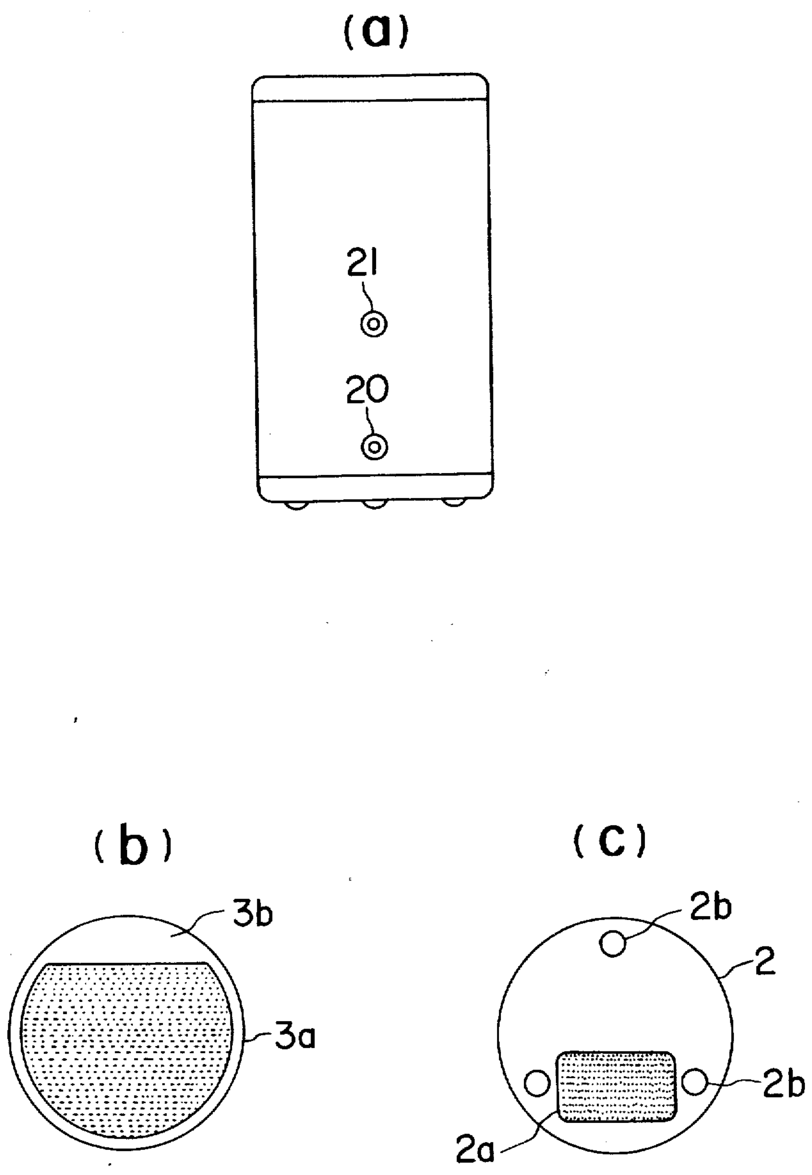

FIG. 3 shows another embodiment of the present invention. In this embodiment, 20 is an earphone socket to insert an earphone plug. 21 is axis hole to support the center axis of a sand timer to indicate the time of a telephone conversation. As shown in FIG. 3*b*, cover 3*a* is a ring having an L shape cross section and opens to the face of speaker 6. The said lower cover lid 3*a* has thick part 3*b* which indicates the location of the said pick-up coil 4 in the case, so that the user is able to put the apparatus near the telephone in the correct position, that is to approach the pick-up coil 4 near the telephone, easily. As shown in FIG. 3*c*, cover 2 has an opening 2*a* to insert an battery there-through, and to facilitate emanation of the voice of speaker 6, there are provided projections 2*b*, 2*b*, 2*b*. By said projections, 2*b*, 2*b*, 2*b*, cover 2 is separated from ground or the surface on which the device is placed and the voice of speaker 6 becomes clear and articulate.

I claim:

1. A loud-speaker device for use with a telephone comprising a case of non-magnetic material, said case having an axis and two opposite ends extending transverse to said axis so that the case can be rested on either of said ends on a supporting surface in proximity to a telephone receiver which is also rested on said supporting surface, said axis being vertical whichever of said ends is rested on the supporting surface, said case containing a pick-up coil for receiving electromagnetic energy from voice frequency current of the telephone, means for amplifying voice frequency current generated in the coil from said energy, a speaker for transducing the output of said amplifier to audible sound, a source of electrical power connected to the amplifier for making the amplifier operational and a switch included in a connection from the power source to the amplifier for turning the power to the amplifier on or off, said switch being a gravity operated switch which activates the amplifier when the case is rested on one end and deactivates the amplifier when the case is rested on the other end, and in which said speaker is at an end of the case and a cover closes said end, and means on the exterior of said cover for indicating the position of the pick-up coil within the case.

2. A device according to claim 1 in which the end of the case opposite that at which the speaker is located has a cover provided with an opening through which the source of electrical power may be inserted into the case, and also provided with projections for resting the case on a supporting surface with clearance from the support, thereby enhancing the clarity and articulation of the sound from the speaker.

* * * * *